(12) United States Patent
Konttori et al.

(10) Patent No.: US 9,711,072 B1
(45) Date of Patent: Jul. 18, 2017

(54) DISPLAY APPARATUS AND METHOD OF DISPLAYING USING FOCUS AND CONTEXT DISPLAYS

(71) Applicant: Varjo Technologies Oy, Helsinki (FI)

(72) Inventors: Urho Konttori, Helsinki (FI); Klaus Melakari, Oulu (FI); Oiva Arvo Oskari Sahlsten, Salo (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 15/366,424

(22) Filed: Dec. 1, 2016

(51) Int. Cl.
| | | |
|---|---|---|
| *G06F 1/00* | (2006.01) | |
| *G09G 3/00* | (2006.01) | |
| *G06F 3/01* | (2006.01) | |
| *G02B 7/08* | (2006.01) | |
| *G02B 7/18* | (2006.01) | |
| *G02B 7/182* | (2006.01) | |

(52) U.S. Cl.
CPC .............. *G09G 3/003* (2013.01); *G02B 7/08* (2013.01); *G02B 7/182* (2013.01); *G02B 7/1805* (2013.01); *G06F 3/013* (2013.01); *G09G 3/002* (2013.01); *G02B 7/1821* (2013.01); *G09G 2340/0407* (2013.01); *G09G 2340/10* (2013.01); *G09G 2340/12* (2013.01)

(58) Field of Classification Search
CPC ..... G06T 19/006; G06T 19/20; G06T 15/503; G06F 3/013
See application file for complete search history.

(56) References Cited

U.S. PATENT DOCUMENTS

| | | |
|---|---|---|
| 931,683 A | 8/1909 | Cox |
| 7,872,635 B2 | 1/2011 | Mitchell |
| 7,973,834 B2 | 7/2011 | Yang |
| 2016/0240013 A1* | 8/2016 | Spitzer .................... G06F 3/013 |
| 2016/0342840 A1* | 11/2016 | Mullins .............. G06K 9/00671 |

OTHER PUBLICATIONS

Anjul Patney et al. "Perceptually-Based Foveated Virtual Reality," Retrieved at https://research.nvidia.com/publication/perceptually-based-foveated-virtual-reality, Jul. 2016, 2 pages.

* cited by examiner

*Primary Examiner* — Michael Faragalla
(74) *Attorney, Agent, or Firm* — Ziegler IP Law Group, LLC (57) ABSTRACT

Disclosed is a display apparatus comprising at least one context display for rendering a context image, at least one focus display for rendering a focus image, and at least one optical combiner for combining the projection of the rendered context image with the projection of the rendered focus image to create a visual scene. An angular width of a projection of the rendered context image ranges from 40 degrees to 220 degrees. An angular width of a projection of the rendered focus image ranges from 5 degrees to 60 degrees.

17 Claims, 6 Drawing Sheets

DISPLAY APPARATUS AND METHOD OF DISPLAYING USING FOCUS AND CONTEXT DISPLAYS

TECHNICAL FIELD

The present disclosure relates generally to virtual reality; and more specifically, to a display apparatus and a method of displaying, via the display apparatus comprising context displays, focus displays and optical combiners.

BACKGROUND

In recent times, there has been rapid increase in use of technologies such as virtual reality, augmented reality, and so forth, for presenting a simulated environment (or a virtual world) to a user. Specifically, the simulated environment enhances the user's experience of reality around him/her by providing the user with a feeling of immersion in the simulated environment using contemporary techniques such as stereoscopy.

Typically, the user may use a device, such as a virtual reality device, for experiencing such simulated environment. For example, the virtual reality devices may include binocular virtual reality device having one display per eye of the user. Specifically, both displays of a binocular virtual reality device may display different two-dimensional images (also known as stereograms) to the eyes of the user for creating an illusion of depth by combining the different two-dimensional images. Optionally, such virtual reality devices may include near field displays. Examples of such virtual reality devices include, head mounted virtual reality devices, virtual reality glasses, and so forth. Further, a field of view of the virtual reality devices is typically about 60° to 150°, whereas a field of view of humans is comparatively greater (i.e. about 180°). A greater field of view results in a greater feeling of immersion and better awareness of surrounding environment.

However, conventional virtual reality devices have certain limitations. In an example, the size of displays suitable for closely imitating visual acuity of the human eyes is too large to be accommodated within the conventionally available virtual reality devices. Specifically, displays with field of view approximately equivalent to the human eyes are dimensionally very large. In another example, comparatively smaller sized displays such as focus plus context screens include a high-resolution display embedded into a low-resolution display. However, position of the high-resolution display within such focus plus context screens is fixed, and images rendered thereon often appear discontinuous at edges of the high and low-resolution displays. Consequently, such focus plus context screens are not sufficiently well developed to be used within the virtual reality devices. Therefore, the conventional virtual reality devices are limited in their ability to mimic the human visual system.

Therefore, in light of the foregoing discussion, there exists a need to overcome the aforementioned drawbacks associated with conventional displays used in virtual reality devices.

SUMMARY

The present disclosure seeks to provide a display apparatus. The present disclosure also seeks to provide a method of displaying, via a display apparatus comprising a context display, a focus display and an optical combiner. The present disclosure seeks to provide a solution to the existing problem of physical size limitations and image discontinuities within displays used in conventional virtual reality devices. An aim of the present disclosure is to provide a solution that overcomes at least partially the problems encountered in prior art, and provides a robust, easy to use display apparatus to closely mimic the human visual system. In one aspect, an embodiment of the present disclosure provides a display apparatus comprising:

at least one context display for rendering a context image, wherein an angular width of a projection of the rendered context image ranges from 40 degrees to 220 degrees;

at least one focus display for rendering a focus image, wherein an angular width of a projection of the rendered focus image ranges from 5 degrees to 60 degrees; and at least one optical combiner for combining the projection of the rendered context image with the projection of the rendered focus image to create a visual scene.

In another aspect, an embodiment of the present disclosure provides a method of displaying, via a display apparatus comprising at least one context display, at least one focus display and at least one optical combiner, the method comprising:

(i) rendering a context image at the at least one context display, wherein an angular width of a projection of the rendered context image ranges from 40 degrees to 220 degrees;

(ii) rendering a focus image at the at least one focus display, wherein an angular width of a projection of the rendered focus image ranges from 5 degrees to 60 degrees; and (iii) using the at least one optical combiner to combine the projection of the rendered context image with the projection of the rendered focus image to create a visual scene.

Embodiments of the present disclosure substantially eliminate or at least partially address the aforementioned problems in the prior art, and enables implementation of active foveation within the display apparatus using gaze contingency.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:
  at least one context display for rendering a context image, wherein an angular width of a projection of the rendered context image ranges from 40 degrees to 220 degrees;
  at least one focus display for rendering a focus image, wherein an angular width of a projection of the rendered focus image ranges from 5 degrees to 60 degrees; and
  at least one optical combiner for combining the projection of the rendered context image with the projection of the rendered focus image to create a visual scene.

In another aspect, an embodiment of the present disclosure provides a method of displaying, via a display apparatus comprising at least one context display, at least one focus display and at least one optical combiner, the method comprising:
(i) rendering a context image at the at least one context display, wherein an angular width of a projection of the rendered context image ranges from 40 degrees to 220 degrees;
(ii) rendering a focus image at the at least one focus display, wherein an angular width of a projection of the rendered focus image ranges from 5 degrees to 60 degrees; and
(iii) using the at least one optical combiner to combine the projection of the rendered context image with the projection of the rendered focus image to create a visual scene.

The present disclosure provides a display apparatus and a method of displaying via the display apparatus. The display apparatus described herein is not limited in operation by size of the focus and context displays. Therefore, the display apparatus may be easily implemented in small-sized devices such as virtual reality devices. Further, the display apparatus simulates active foveation of the human visual system by detecting gaze direction of the eye and taking into account saccades and microsaccades of the human eye. Furthermore, the displayed images using the described display apparatus appear continuous due to proper combination of its constituent projections by the optical combiner. Therefore, the described display apparatus closely imitates gaze contingency to imitate the human visual system. Further, components of the display apparatus are inexpensive, and easy to manufacture. Moreover, the method of displaying using the display apparatus is accordingly easy to implement, and possesses robust active foveation capability.

The display apparatus comprises at least one context display for rendering a context image, at least one focus display for rendering a focus image, and at least one optical combiner for combining the projection of the rendered context image with the projection of the rendered focus image to create a visual scene. An angular width of a projection of the rendered context image ranges from 40 degrees to 220 degrees. An angular width of a projection of the rendered focus image ranges from 5 degrees to 60 degrees. Specifically, the visual scene may correspond to a scene within a simulated environment to be presented to a user of a device, such as a head-mounted virtual reality device, virtual reality glasses, augmented reality headset, and so forth. More specifically, the visual scene may be projected onto eyes of the user. In such instance, the device may comprise the display apparatus described herein.

Optionally, the angular width of a projection of the rendered context image may be greater than 220 degrees. In such instance, angular dimensions of the context display for rendering the context image may be larger than 220 degrees. According to an embodiment, the angular width of a projection of the rendered context image may be for example from 40, 50, 60, 70, 80, 90, 100, 110, 120, 130, 140, 150, 160 or 170 degrees up to 70, 80, 90, 100, 110, 120, 130, 140, 150, 160, 170, 180, 190, 200, 210 or 220 degrees. According to another embodiment the angular width of a projection of the rendered focus image may be for example from 5, 10, 15, 20, 25, 30, 35, 40, 45 or 50 degrees up to 15, 20, 25, 30, 35, 40, 45, 50, 55 or 60 degrees.

In an embodiment, the context image relates to a wide image of the visual scene to be rendered and projected via the display apparatus. Specifically, the aforementioned angular width of the context image accommodates saccades associated with movement of the eyes of the user. In another embodiment, the focus image relates to an image, to be rendered and projected via the display apparatus. Specifically, the aforementioned angular width of the focus image accommodates microsaccades associated with movement of the eyes of the user. Further, the focus image is dimensionally smaller than the context image. Furthermore, the context and focus images collectively constitute the visual scene upon combination of projections thereof.

In an embodiment, the term 'context display' used herein relates to a display (or screen) adapted to facilitate rendering of the context image thereon. Specifically, the at least one context display may be adapted to receive a projection of the context image thereon. According to an embodiment, the at least one context display may be selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

In an embodiment, the term 'focus display' used herein relates to a display (or screen) adapted to facilitate rendering of the focus image thereon. Specifically, the at least one focus display may be adapted to receive a projection of the focus image thereon. According to an embodiment, the at least one focus display may be selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, the at least one context display and/or the at least one focus display are implemented by way of at least one projector and at least one projection screen. For example, one context display may be implemented by way of one projector and one projection screen associated with the one projector.

According to an embodiment, the at least one context display may be statically positioned and the at least one focus display may be movable for desired projection of the rendered context and focus images. Specifically, the at least one focus display may be moved to adjust position of the projection of the rendered focus image. Alternatively, the at least one context and focus displays may be positionally exchanged. Specifically, in such instance, the at least one context display may be movable and the at least one focus display may be statically positioned.

In an embodiment, dimensions of the at least one context display are larger as compared to dimensions of the at least one focus display. Specifically, the at least one focus display may be much smaller in size than the at least one context display. Therefore, it may be evident that the at least one focus display may be moved easily as compared to the at least one context display.

The display apparatus comprises the at least one optical combiner for combining the projection of the rendered context image with the projection of the rendered focus image to create the visual scene. According to an embodiment of the present disclosure, the term 'optical combiner' used herein relates to equipment (such as optical elements) for combining the projection of the rendered context image and the projection of the rendered focus image to constitute the visual scene. Specifically, the at least one optical combiner may be configured to simulate active foveation of the human visual system.

According to an embodiment, the display apparatus may further comprise means for detecting a gaze direction, and a processor coupled in communication with the at least one optical combiner and the means for detecting the gaze direction.

In an embodiment, the processor may be hardware, software, firmware or a combination of these, suitable for controlling operation of the display apparatus. Specifically, the processor may control operation of the display apparatus to process and display (or project) the visual scene onto the eyes of the user. In an instance wherein the display apparatus is used within the device associated with the user, the processor may or may not be external to the device.

Optionally, the processor may be communicably coupled to a memory unit. In an embodiment, the memory unit may be hardware, software, firmware or a combination of these, suitable for storing images to be processed by the processor.

In an embodiment, the means for detecting a gaze direction relates to specialized equipment for measuring a direction of gaze of the eye and movement of the eye, such as eye trackers. Specifically, an accurate detection of the gaze direction may allow the display apparatus to closely implement gaze contingency thereon. Further, the means for detecting the gaze direction, may or may not be placed in contact with the eye. Examples of the means for detecting a gaze direction include contact lenses with sensors, cameras monitoring position of pupil of the eye, and so forth.

According to an embodiment, the processor may be configured to receive an input image, and use the detected gaze direction to determine a region of visual accuracy of the input image. According to an embodiment, the term 'input image' used herein relates to an image (such as an image of the visual scene) to be displayed via the display apparatus. In an embodiment, the input image may be received from an image sensor coupled to the device associated with the user. Specifically, the image sensor may capture an image of a real-world environment as the input image to be projected onto the eye. In an example, the processor receives an input image of a coffee shop whereat the user may be present, from the image sensor of a head-mounted virtual reality device associated with the user. In another embodiment, the input image may be received from the memory unit communicably coupled to the processor. Specifically, the memory unit may be configured to store the input image in a suitable format including, but not limited to, Moving Pictures Experts Group (MPEG), Joint Photographic Experts Group (JPEG), Tagged Image File Format (TIFF), Portable Network Graphics (PNG), Graphics Interchange Format (GIF), and Bitmap file format (BMP).

In the aforementioned embodiment, the processor may use the detected gaze direction to determine a region of visual accuracy of the input image. In an embodiment, the region of visual accuracy relates to a region of the input image whereat the detected gaze direction of the eye may be focused. Specifically, the region of visual accuracy may be a region of interest (or a fixation point) within the input image, and may be projected onto fovea of the eye. Further, the region of visual accuracy may be the region of focus within the input image. Therefore, it may be evident that the region of visual accuracy relates to a region resolved to a much greater detail as compared to other regions of the input image, when the input image is viewed by a human visual system.

Further, in the aforementioned embodiment, after determining the region of visual accuracy of the input image, the processor may be configured to process the input image to generate the context image and the focus image, the context image having a first resolution and the focus image having a second resolution. The second resolution is higher than the first resolution. The focus image substantially corresponds to the region of visual accuracy of the input image. Specifically, the context image corresponds to a low-resolution representation of the input image. Therefore, the context image includes the region of visual accuracy of the input image along with remaining region of the input image. More specifically, size of the context image is larger than size of the focus image since the focus image corresponds to only a portion of the context image whereat the detected gaze direction of the eye may be focused.

In an embodiment, the first and second resolutions may be understood in terms of angular resolution. Specifically, pixels per degree indicative of the second resolution are higher than pixels per degree indicative of the first resolution. In an example, fovea of the eye of the user corresponds to 2 degrees of visual field and receives the projection of the focus image of angular cross section width equal to 114 pixels indicative of 57 pixels per degree. Therefore, an angular pixel size corresponding to the focus image would equal 2/114 or 0.017. Further in such example, the retina of the eye corresponds to 180 degrees of visual field and receives projection of the context image of angular cross section width equal to 2700 pixels indicative of 15 pixels per degree. Therefore, an angular pixel size corresponding to the context image would equal 180/2700 or 0.067. As calculated, the angular pixel size corresponding to the context image is clearly much larger than the angular pixel size corresponding to the focus image. However, a perceived angular resolution indicated by a total number of pixels may be greater for the context image as compared to the focus image since the focus image corresponds to only a part of the context image, wherein the part corresponds to the region of visual accuracy of the input image.

In the aforementioned embodiment, along with the generation of the context image and the focus image, a region of the context image that substantially corresponds to the region of visual accuracy of the input image is masked. Specifically, the masking may be performed by the processor to hide (or obscure) the region of the context image corresponding to the region of visual accuracy of the input image. For example, pixels of the context image corresponding to the region of visual accuracy of the input image may be dimmed for masking.

In the aforementioned embodiment, after processing the input image, the processor may be configured to render the context image at the at least one context display and the focus image at the at least one focus display substantially simultaneously, whilst controlling the at least one optical combiner to combine the projection of the rendered context image with the projection of the rendered focus image in a manner that the projection of the rendered focus image substantially overlaps the projection of the masked region of the rendered context image. Specifically, the combined projections of the rendered context and focus images may collectively constitute a projection of the input image. It may be evident that the context and focus images are rendered substantially simultaneously in order to avoid time lag during combination of projections thereof.

The angular width of the projection of the rendered context image is larger than the angular width of the projection of the rendered focus image. This may be attributed to the fact that the rendered focus image is typically projected on and around the fovea of the eye, whereas the rendered context image is projected on a retina of the eye, of which the fovea is just a small part. Specifically, a combination of the rendered context and focus images constitutes the input image and may be projected onto the eye to project the input image thereon.

In an embodiment, rendering the context image, rendering the focus image, and controlling the at least one optical combiner to combine the projection of the rendered context image with the projection of the rendered focus image are performed substantially simultaneously.

The at least one optical combiner substantially overlaps the projection of the rendered focus image with the projection of the masked region of the rendered context image to avoid distortion of the region of visual accuracy of the input image. Specifically, the region of visual accuracy of the input image is represented within both, the rendered context image of low resolution and the rendered focus image of high resolution. The overlap (or superimposition) of projections of low and high-resolution images of a same region results in distortion of appearance of the same region. Further, the rendered focus image of high resolution may contain more information pertaining to the region of visual accuracy of the input image, as compared to the rendered context image of low resolution. Therefore, the region of the context image that substantially corresponds to the region of visual accuracy of the input image is masked, in order to project the rendered high-resolution focus image without distortion.

Furthermore, processor may be configured to mask the region of the context image corresponding to the region of visual accuracy of the input image such that transitional area seams (or edges) between the region of visual accuracy of the input image and remaining region of the input image are minimum. It is to be understood that the region of visual accuracy of the displayed input image corresponds to the projection of the focus image (and the masked region of the context image) whereas the remaining region of the displayed input image corresponds to the projection of the context image. Specifically, the masking should be performed as a gradual gradation in order to minimize the transitional area seams between the superimposed context and focus images so that the displayed input image appears continuous. For example, the processor may significantly dim pixels of the context image corresponding to the region of visual accuracy of the input image, and gradually reduce the amount of dimming of the pixels with increase in distance thereof from the region of visual accuracy of the input image.

Optionally, masking the region of the context image that substantially corresponds to the region of visual accuracy of the input image may be performed using linear transparency mask blend of inverse values between the context image and the focus image at the transition area, stealth (or camouflage) patterns containing shapes naturally difficult for detection by the eyes of the user, and so forth. If alignment and appearance of the combined projections of the rendered context and focus images are improper and/or have discontinuities, then the projection of the input image would also be improper.

In an embodiment, the processor may implement image processing functions for at least one of the at least one context display and the at least one focus display. Specifically, the image processing functions may be implemented prior to rendering the context image at the at least one context display and the at least one focus image at the focus display. More specifically, implementation of such image processing functions may optimize quality of the rendered context and focus images. Therefore, the image processing function may be selected by taking into account properties of at least one of the at least one context display and the at least one focus display, and the properties of the input image.

According to an embodiment, image processing functions for the at least one context display may comprise at least one function for optimizing perceived context image quality, the at least one function selected from the group comprising low pass filtering, colour processing, and gamma correction. In an embodiment, the image processing functions for the at least one context display may further comprise edge processing to minimize perceived distortion on a boundary of combined projections of the rendered context and focus images.

According to another embodiment, image processing functions for the at least one focus display may comprise at least one function for optimizing perceived focus image quality, the at least one function selected from the group comprising image cropping, image sharpening, colour processing, and gamma correction. In an embodiment, the image processing functions for the at least one focus display may further comprise edge processing to minimize perceived distortion on a boundary of combined projections of the rendered context and focus images.

In an embodiment, the at least one optical combiner may comprise at least one first optical element that is arranged for any of allowing the projection of the rendered context image to pass through substantially, whilst reflecting the projection of the rendered focus image substantially, or allowing the projection of the rendered focus image to pass through substantially, whilst reflecting the projection of the rendered context image substantially. Specifically, the at least one first optical element may be arranged to combine optical paths of the projections of the rendered context and focus images. It may be evident that such arrangement of the at least one first optical element facilitates projection of the rendered focus image on and around the fovea of the eye, and projection of the rendered context image is projected on a retina of the eye, of which the fovea is just a small part. In an embodiment, the at least one first optical element of the at least one optical combiner may be implemented by way of at least one of: a semi-transparent mirror, a semi-transparent film, a prism, a polarizer, an optical waveguide.

For example, the at least one first optical element of the at least one optical combiner may be implemented as an optical waveguide. In such example, the optical waveguide may be arranged to allow the projection of the rendered focus image to pass to field of vision of the eyes of the user by reflection therefrom. Further, in such example, the optical waveguide may be transparent such that the at least one context display (and specifically, the context image) is visible therethrough. Therefore, the optical waveguide may be semi-transparent. Alternately, the optical waveguide may be arranged to allow the projection of the rendered context image to pass to field of vision of the eyes of the user by reflection therefrom and the optical waveguide may be transparent such that the at least one focus display (and specifically, the focus image) is visible therethrough. Such an implementation may also be utilized if the at least one focus display is implemented by way of the at least one projector which may be movable using an actuator associated therewith.

In an embodiment, the optical waveguide may further comprise optical elements therein such as microprisms, mirrors, diffractive optics, and so forth. Optionally, the optical waveguide may be tiltable and/or movable.

According to an embodiment, the at least one optical combiner may comprise at least one first actuator for moving the at least one focus display with respect to the at least one first optical element of the at least one optical combiner, wherein the processor is configured to control the at least one first actuator to adjust a location of the projection of the rendered focus image on the at least one first optical element. Specifically, the at least one first actuator may move the at least one focus display when the gaze direction of the eye shifts from one direction to another. In such instance, the arrangement of the at least one optical element and the at least one focus display may not project the rendered focus image on and around the fovea of the eye. Therefore, the processor may control the at least one first actuator to move the at least one focus display with respect to the at least one first optical element, to adjust the location of the projection of the rendered focus image on the at least one first optical element such that the rendered focus image may be projected on and around the fovea of the eye even on occurrence of shift in the gaze direction. More specifically, the processor may control the at least one first actuator by generating an actuation signal (such as an electric current, hydraulic pressure, and so forth).

In an example, the at least one first actuator may move the at least one focus display closer or away from the at least one first optical element. In another example, the at least one first actuator may move the at least one focus display laterally with respect to the at least one first optical element. In yet another example, the at least one first actuator may tilt and/or rotate the at least one focus display with respect to the at least one first optical element.

According to another embodiment, the at least one optical combiner may comprise at least one second optical element that is positioned on an optical path between the at least one first optical element and the at least one focus display, and at least one second actuator for moving the at least one second optical element with respect to the at least one first optical element. In such embodiment, the at least one second optical element may be selected from the group consisting of a lens, a prism, a mirror, and a beam splitter. Further, in such embodiment, the processor is configured to control the at least one second actuator to adjust the location of the projection of the rendered focus image on the at least one first optical element. Specifically, the second optical element may change the optical path of the projection of the rendered focus image on the at least one first optical element in order to facilitate projection of the rendered focus image on and around the fovea of the eye even on occurrence of shift in the gaze direction. More specifically, the processor may control the at least one second actuator by generating an actuation signal (such as an electric current, hydraulic pressure, and so forth).

For example, two prisms may be positioned on an optical path between the semi-transparent mirror (the at least one first optical element) and the at least one focus display. Specifically, the optical path of the projection of the rendered focus image may change on passing through the two prisms to adjust the location of the projection of the rendered focus image on the semi-transparent mirror. Further, the two prisms may be moved transversally and/or laterally, be rotated, be tilted, and so forth, by the at least one second actuator in order to facilitate projection of the rendered focus image on and around the fovea of the eye even on occurrence of shift in the gaze direction.

In an embodiment of the present disclosure, the at least one optical combiner may comprise at least one third actuator for moving the at least one first optical element, wherein the processor is configured to control the at least one third actuator to adjust the location of the projection of the rendered focus image on the at least one first optical element. Specifically, the at least one third actuator may move the at least one first optical element in order to facilitate projection of the rendered focus image on and around the fovea of the eye even on occurrence of shift in the gaze direction. More specifically, the processor may control the at least one third actuator by generating an actuation signal (such as an electric current, hydraulic pressure, and so forth).

In an example, the at least one third actuator may move the at least one first optical element closer or away from the at least one focus display. In another example, the at least one third actuator may move the at least one first optical element laterally with respect to the at least one focus display. In yet another example, the at least one third actuator may tilt and/or rotate the at least one first optical element.

According to an embodiment, the display apparatus may comprise at least one focusing lens that is positioned on an optical path between the at least one first optical element and the at least one focus display, and at least one fourth actuator for moving the at least one focusing lens with respect to the at least one focus display. In such embodiment, the processor may be configured to control the at least one fourth actuator to adjust a focus of the projection of the rendered focus image. Specifically, the at least one focusing lens may utilize specialized properties thereof to adjust the focus of the projection of the rendered focus image by changing the optical path thereof. More specifically, the focus of the projection of the rendered focus image may be adjusted to accommodate for diopter tuning, astigmatism correction, and so forth. More specifically, the processor may control the at least one fourth actuator by generating an actuation signal (such as an electric current, hydraulic pressure, and so forth).

According to another embodiment, the display apparatus may comprise the at least one focusing lens that is positioned on an optical path between the at least one first optical element and the at least one focus display, wherein the processor is configured to control at least one active optical characteristic of the at least one focusing lens by applying a control signal to the at least one focusing lens. Specifically, the active optical characteristics of the at least one focusing lens may include, but are not limited to, focal length, and optical power. Further, in such embodiment, the control signal may be electrical signal, hydraulic pressure, and so forth.

In an embodiment, the at least one focusing lens may a Liquid Crystal lens (LC lens), and so forth. Optionally, the at least one focusing lens may be positioned on an optical path between the at least one first optical element and the at least one context display.

It is to be understood that physical size (or dimensions) of the at least one context and focus displays may not limit operation of the display apparatus described hereinabove. Specifically, physically small sized context and focus displays may be used along with enlarging lenses in the optical paths of the rendered context and focus images to ensure desired size of the projections thereof.

Optionally, the aforementioned display apparatus may be used to receive another input image, process the another input image to generate another focus and context images, and render the another focus and context images whilst combining projections of the rendered another focus and context images. In an example, the another input image may be received from a video camera of a head-mounted virtual reality device associated with the user.

The present description also relates to the method as described above. The various embodiments and variants disclosed above apply mutatis mutandis to the method.

DETAILED DESCRIPTION OF THE DRAWINGS

Figure 1:
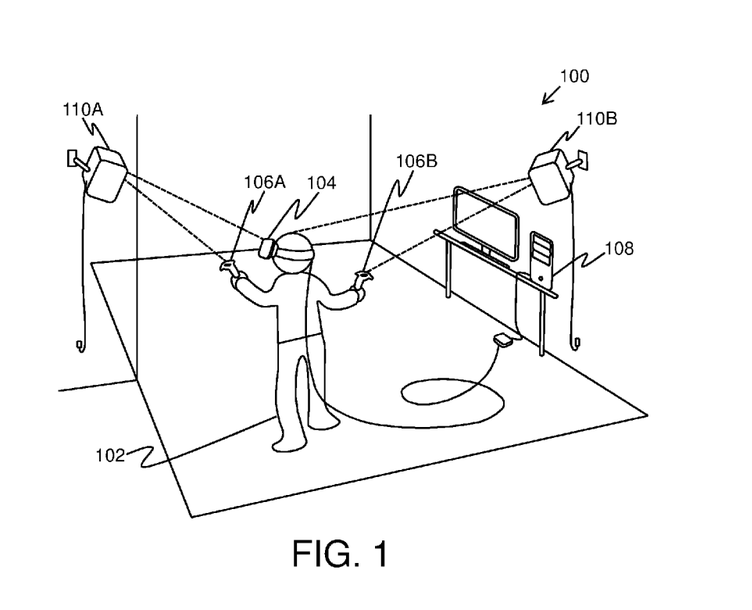
FIG. 1 is a schematic illustration of an environment for using a display apparatus, in accordance with an embodiment of the present disclosure.

Referring to FIG. 1, illustrated is a schematic illustration of an environment 100 for using a display apparatus, in accordance with an embodiment of the present disclosure. The environment 100 includes a user 102 wearing a device 104, such as a head-mounted virtual reality device. In the exemplary environment 100, the device 104 is capable of implementing a virtual environment. Further, the device 104 includes the display apparatus (not shown) for implementing active foveation. Furthermore, operation of the device 104 is controlled by a processing unit 108. As shown, the user 102 is holding handheld actuators 106A and 106B to interact with the virtual environment. Therefore, the environment 100 also includes spatial locators 110A and 110B to identify spatial coordinates of the device 104 and the handheld actuators 106A and 106B. The spatial locators 110A and 110B are configured to transmit the identified spatial coordinates to the processing unit 108.

Figure 2:
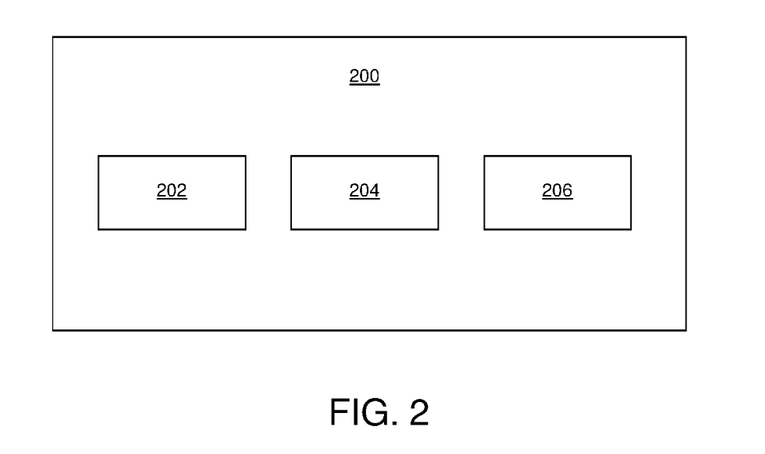
FIGS. 2-3 are block diagrams of architectures of the display apparatus, in accordance with different embodiments of the present disclosure.

Referring to FIG. 2, illustrated is a block diagram of architecture of a display apparatus 200 (as the display apparatus of the device 104 of FIG. 1), in accordance with an embodiment of the present disclosure. The display apparatus 200 includes at least one context display 202 for rendering a context image, at least one focus display 204 for rendering a focus image, and at least one optical combiner 206 for combining the projection of the rendered context image with the projection of the rendered focus image to create a visual scene.

Figure 3:
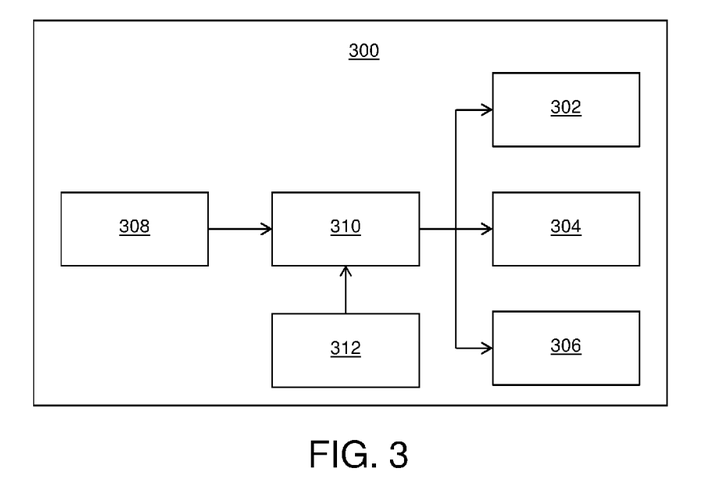

Referring to FIG. 3, illustrated is a block diagram of architecture of a display apparatus 300 (such as the display apparatus of the device 104 of FIG. 1), in accordance with another embodiment of the present disclosure. The display apparatus 300 includes at least one context display 302 for rendering a context image, at least one focus display 304 for rendering a focus image, at least one optical combiner 306, means for detecting a gaze direction 308, and a processor 310. The optical combiner 306 combines a projection of the rendered context image with a projection of the rendered focus image to create a visual scene. As shown, the processor 310 is coupled to the at least one context display 302 and the at least one focus display 304. Further, the processor 310 is coupled in communication with the at least one optical combiner 306 and the means for detecting the gaze direction 308.

Figure 4A:
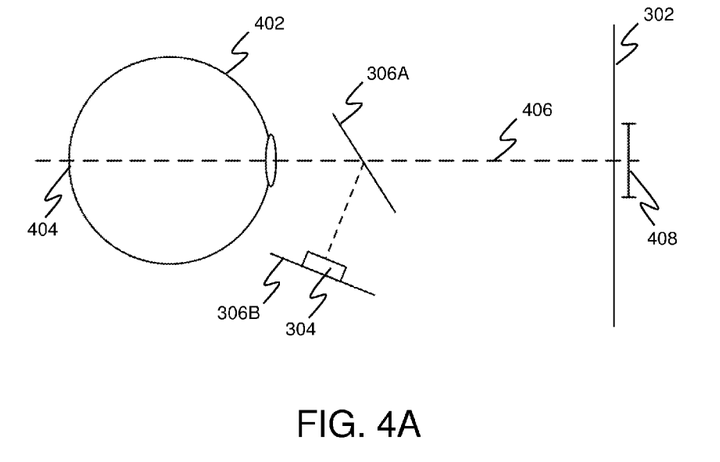
FIGS. 4A-4B are schematic illustrations of exemplary operation of the display apparatus with respect to an eye; in accordance with different embodiments of the present disclosure.

Referring to FIG. 4A, illustrated is an exemplary operation of a display apparatus (such as the display apparatus 300, shown in FIG. 3) with respect to an eye 402; in accordance with an embodiment of the present disclosure. As shown, a gaze direction of the eye is straight (or in forward direction). It may be evident that a line of sight 406 represents centre of a visual field along the gaze direction that is projected onto the eye 402. Further, fovea 404 is a depression-like region at a central part of retina of the eye 402. An input image of the visual field along the gaze direction is projected onto the eye 402 using the display apparatus shown to include the at least one context display 302, the at least one focus display 304, and the at least one optical combiner 306 such as at least one first optical element 306A and at least one first actuator 306B. In an example, the at least one first optical element 306A is a semi-transparent mirror. The at least one first actuator 306B is operable to move the at least one focus display 304 with respect to the at least one first optical element 306A of the at least one optical combiner 306. The at least one focus display 304 projects a focus image onto the fovea 404 using the at least one first optical element 306A and the at least one first actuator 306B. Specifically, the at least one first optical element 306A reflects rays from the at least one focus display 304 towards the fovea 404. The at least one context display 302 projects a context image onto the eye 402 substantially through the at least one first optical element 306A. The at least one first optical element 306A and the at least one first actuator 306B are arranged such that the projection of the context image is combined with the projection of the focus image in a manner that the projection of the focus image substantially overlaps the projection of a masked region 408 of the context image. As shown, the masked region 408 is a portion of the at least one context display 302 that is dimmed while projecting the context image onto the fovea 404 to avoid distortion between projections of the focus and the context images.

Figure 4B:
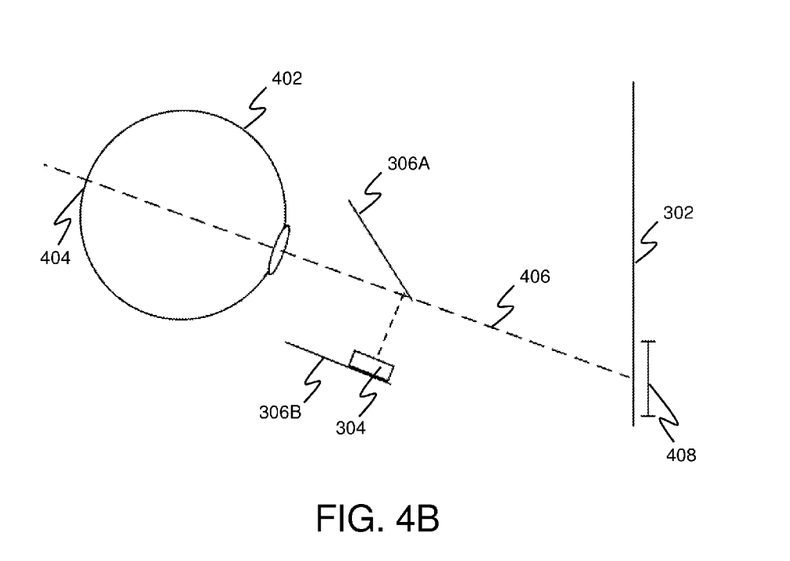

Referring to FIG. 4B, illustrated is a sideways shift in gaze direction of the eye as compared to FIG. 4A. The image of visual field along the gaze direction (depicted by the line of sight 406) is projected onto the eye 402 using the display apparatus shown to include the at least one context display 302, the at least one focus display 304, and the at least one optical combiner 306 such as the at least one first optical element 306A and the at least one first actuator 306B. As shown, due to shift in gaze direction, the at least one focus display 304 is moved sideways with respect to the at least one first optical element 306A by the at least one first actuator 306B to continue projection of the focus image onto the fovea 404. Therefore, the masked region 408 on the at least one context display 302 is also moved to accommodate for shift in gaze direction.

Figure 5:
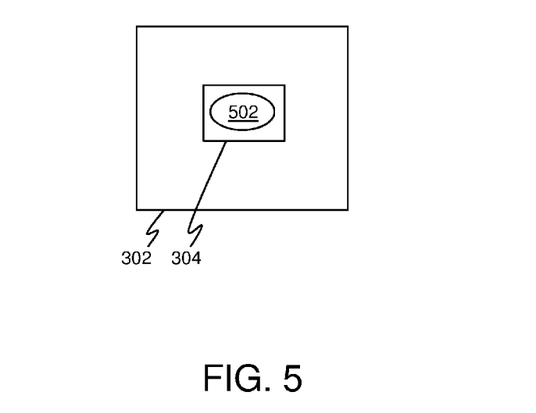
FIG. 5 is an exemplary representation of a context display and a focus display of the display apparatus, in accordance with an embodiment of the present disclosure.

Referring to FIG. 5, illustrated is an exemplary representation of at least one context display 302 and at least one focus display 304 of the display apparatus 300, in accordance with an embodiment of the present disclosure. Specifically, the at least one context display 302 is a low-resolution display whereas the at least one focus display 304 is a high-resolution display. As shown, dimensions of the at least one context display 302 are larger as compared to dimensions of the at least one focus display 304. Further, a focus image rendered at the at least one focus display 304 substantially corresponds to a region of visual accuracy 502 of an input image whereat the gaze direction is focused.

Referring to FIGS. 6A-6I, illustrated are exemplary implementations of the display apparatus 300 (as shown in FIG. 3), in accordance with various embodiments of the present disclosure. It may be understood by a person skilled in the art that the FIGS. 6A-6I include simplified arrangements for implementation of the display apparatus 300 for sake of clarity, which should not unduly limit the scope of the claims herein. The person skilled in the art will recognize many variations, alternatives, and modifications of embodiments of the present disclosure.

Figure 6A:
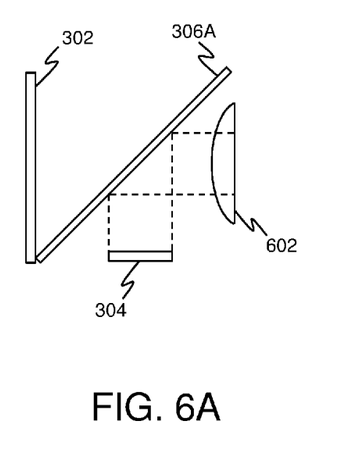
FIGS. 6A-6I are exemplary implementations of the display apparatus, in accordance with various embodiments of the present disclosure.

Referring to FIG. 6A, illustrated is an exemplary implementation of a display apparatus (such as the display apparatus 300, shown in FIG. 3), in accordance with an embodiment of the present disclosure. The display apparatus is shown to include the at least one context display 302, the at least one focus display 304, and the at least one optical combiner having the at least one first optical element 306A. Further, the display apparatus includes a focus lens 602 positioned on an optical path of projections of the context and focus images. The focus lens 602 is one of an enlarging or a shrinking (or reducing) lens.

Figure 6B:
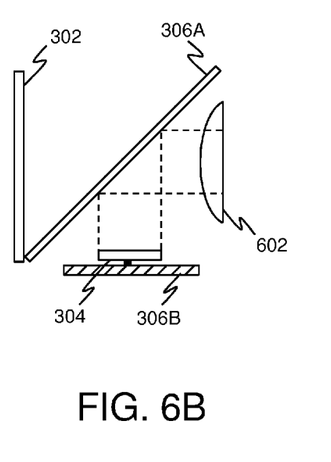

Referring to FIG. 6B, illustrated is another exemplary implementation of a display apparatus (such as the display apparatus 300, shown in FIG. 3), in accordance with an embodiment of the present disclosure. The display apparatus is shown to include the at least one context display 302, the at least one focus display 304, and the at least one optical combiner having the at least one first optical element 306A and the at least one first actuator 306B. The at least one first actuator 306B moves the at least one focus display 304 with respect to the at least one first optical element 306A of the at least one optical combiner. A processor (such as the processor 310 shown in FIG. 3) of the display apparatus is configured to control the at least one first actuator 306B to adjust a location of the projection of the rendered focus image on the at least one first optical element 306A. Further, the display apparatus includes the focus lens 602 positioned on an optical path of projections of the context and focus images.

Figure 6C:
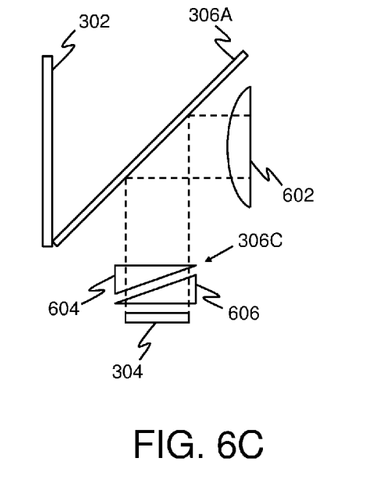

Referring to FIG. 6C, illustrated is another exemplary implementation of a display apparatus (such as the display apparatus 300, shown in FIG. 3), in accordance with an embodiment of the present disclosure. The display apparatus is shown to include the at least one context display 302, the at least one focus display 304, and the at least one optical combiner having the at least one first optical element 306A, at least one second optical element 306C (such as two prisms 604 and 606), and at least one second actuator (not shown). As shown, the at least one second optical element 306C, specifically, the two prisms 604 and 606, are positioned on an optical path between the at least one first optical element 306A and the at least one focus display 304. The at least one second actuator (not shown) moves the two prisms 604 and 606 with respect to the at least one first optical element 306A. A processor (such as the processor 310 shown in FIG. 3) of the display apparatus is configured to control the at least one second actuator (not shown) to adjust a location of the projection of the rendered focus image on the at least one first optical element 306A. Further, the display apparatus includes the focus lens 602 positioned on an optical path of projections of the context and focus images.

Figure 6D:
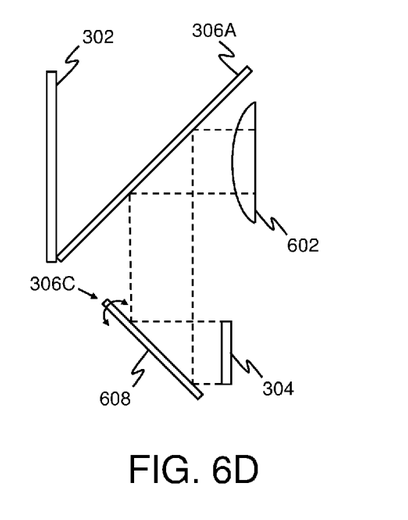

Referring to FIG. 6D, illustrated is another exemplary implementation of a display apparatus (such as the display apparatus 300, shown in FIG. 3), in accordance with an embodiment of the present disclosure. The display apparatus is shown to include the at least one context display 302, the at least one focus display 304, and the at least one optical combiner having the at least one first optical element 306A, at least one second optical element 306C (such as a mirror 608), and at least one second actuator (not shown). As shown, the mirror 608 is positioned on an optical path between the at least one first optical element 306A and the at least one focus display 304. The at least one second actuator (not shown) tilts the mirror 608 with respect to the at least one first optical element 306A. A processor (such as the processor 310 shown in FIG. 3) of the display apparatus is configured to control the at least one second actuator (not shown) to adjust a location of the projection of the rendered focus image on the at least one first optical element 306A. Further, the display apparatus includes the focus lens 602 positioned on an optical path of projections of the context and focus images.

Figure 6E:
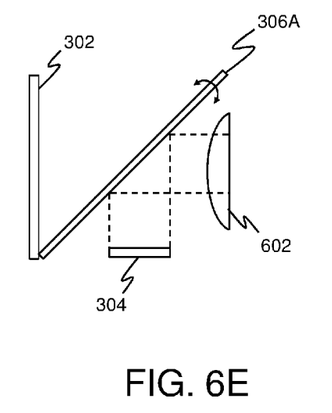

Referring to FIG. 6E, illustrated is another exemplary implementation of a display apparatus (such as the display apparatus 300, shown in FIG. 3), in accordance with an embodiment of the present disclosure. The display apparatus is shown to include the at least one context display 302, the at least one focus display 304, and the at least one optical combiner having the at least one first optical element 306A, and at least one third actuator (not shown) for rotating the at least one first optical element 306A along at least one axis. A processor (such as the processor 310 shown in FIG. 3) of the display apparatus is configured to control the at least one third actuator (not shown) to adjust a location of the projection of the rendered focus image on the at least one first optical element 306A. Further, the display apparatus includes the focus lens 602 positioned on an optical path of projections of the context and focus images.

Figure 6F:
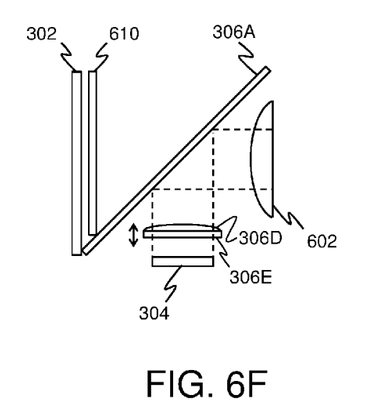

Referring to FIG. 6F, illustrated is another exemplary implementation of a display apparatus (such as the display apparatus 300, shown in FIG. 3), in accordance with an embodiment of the present disclosure. The display apparatus is shown to include the at least one context display 302, the at least one focus display 304, and the at least one optical combiner having the at least one first optical element 306A, at least one focusing lens 306D positioned on an optical path between the at least one first optical element 306A and the at least one focus display 304, and at least one fourth actuator 306E for moving the at least one focusing lens 306D with respect to the at least one focus display 304. A processor (such as the processor 310 shown in FIG. 3) of the display apparatus is configured to control the at least one fourth actuator 306E to adjust a focus of the projection of the rendered focus image. As shown, an additional lens 610 may optionally be positioned in an optical path between the at least one context display 302 and the at least one first optical element 306A. Further, the display apparatus includes the focus lens 602 positioned on an optical path of projections of the context and focus images.

Figure 6G:
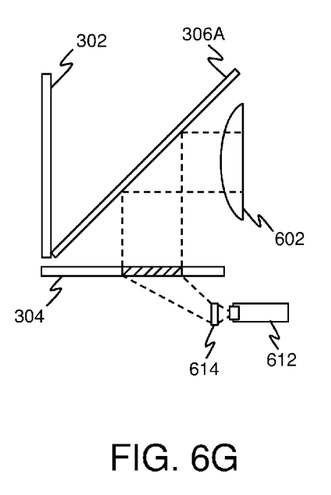

Referring to FIG. 6G, illustrated is another exemplary implementation of a display apparatus (such as the display apparatus 300, shown in FIG. 3), in accordance with an embodiment of the present disclosure. The display apparatus is shown to include the at least one context display 302, the at least one focus display 304 such as a projection screen associated with a projector 612, and the at least one optical combiner having at least one first optical element 306A. It may be evident that the projector 612 is used to generate the focus image instead of a processor (such as the processor 310 shown in FIG. 3) of the display apparatus. Further, a prism 614 is positioned in an optical path between the projector 612 and the at least one focus display 304 to render the focus image thereon. In an example, the projector 612 and/or the at least one focus display 304 may be moved using actuators. Further, the display apparatus includes the focus lens 602 positioned on an optical path of projections of the context and focus images.

Figure 6H:
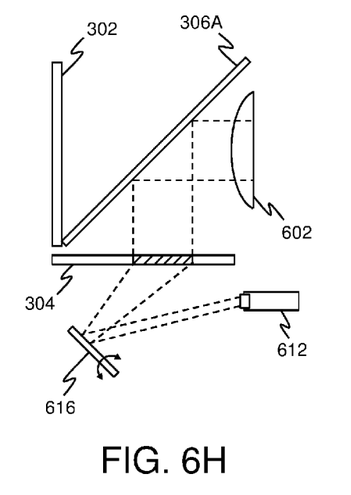

Referring to FIG. 6H, illustrated is yet another exemplary implementation of a display apparatus (such as the display apparatus 300, shown in FIG. 3), in accordance with an embodiment of the present disclosure. The display apparatus is shown to include the at least one context display 302, the at least one focus display 304 such as the projection screen associated with the projector 612, and the at least one optical combiner having the at least one first optical element 306A. It may be evident that the projector 612 is used to generate the focus image instead of a processor (such as the processor 310 shown in FIG. 3) of the display apparatus. Further, a rotatable mirror 616 is positioned in an optical path between the projector 612 and the at least one focus display 304 to render the focus image thereon. In an example, the projector 612, the rotatable mirror 616 and/or the at least one focus display 304 may be moved using actuators. Further, the display apparatus includes the focus lens 602 positioned on an optical path of projections of the context and focus images.

Figure 6I:
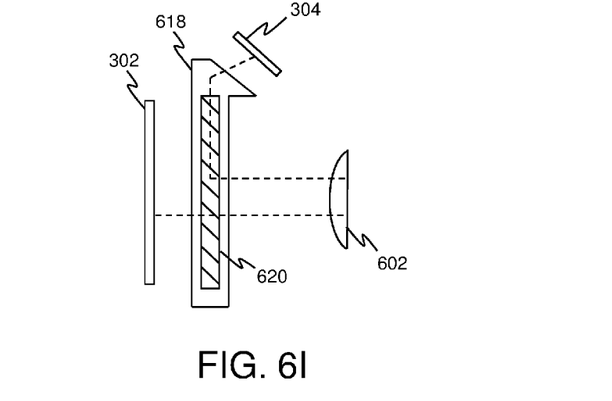

Referring to FIG. 6I, illustrated is yet another exemplary implementation of a display apparatus (such as the display apparatus 300, shown in FIG. 3), in accordance with an embodiment of the present disclosure. The display apparatus is shown to include the at least one context display 302, the at least one focus display 304, and the at least one optical combiner having at least one optical element such as an optical waveguide 618 arranged for allowing the projection of the rendered context image to pass through substantially, whilst reflecting the projection of the rendered focus image substantially. As shown, the optical waveguide 618 has optical elements 620 therein such as microprisms, mirrors, diffractive optics, and so forth. Alternatively, the optical waveguide 618 may be arranged for allowing the projection of the rendered focus image to pass through substantially, whilst reflecting the projection of the rendered context image substantially. Further, the display apparatus includes the focus lens 602 positioned on an optical path of projections of the context and focus images.

Figure 7:
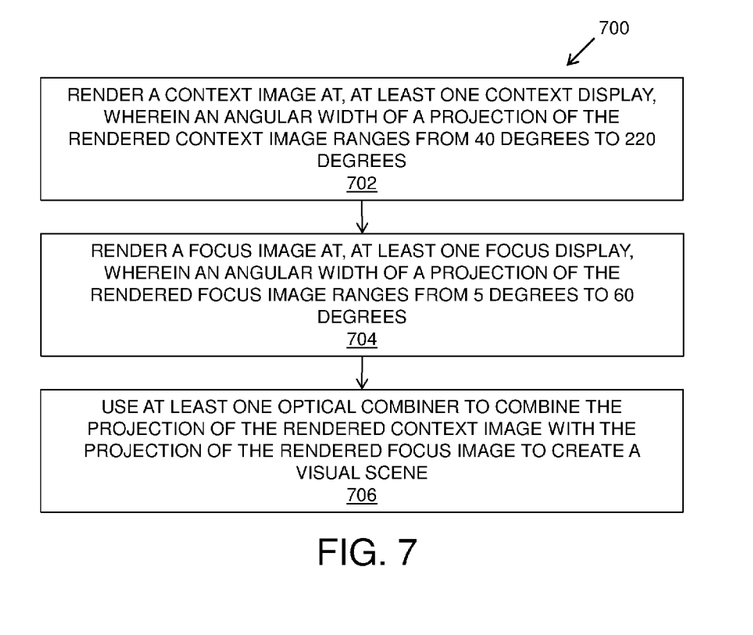
FIG. 7 illustrates steps of a method of displaying via the display apparatus, in accordance with an embodiment of the present disclosure.

Referring to FIG. 7, illustrated are steps of a method 700 of displaying via the display apparatus 300, in accordance with an embodiment of the present disclosure. At step 702, a context image is rendered at, at least one context display, wherein an angular width of a projection of the rendered context image ranges from 40 degrees to 220 degrees. At step 704, a focus image is rendered at, at least one focus display, wherein an angular width of a projection of the rendered focus image ranges from 5 degrees to 60 degrees. At step 706, at least one optical combiner is used to combine the projection of the rendered context image with the projection of the rendered focus image to create a visual scene.

The steps 702 to 706 are only illustrative and other alternatives can also be provided where one or more steps are added, one or more steps are removed, or one or more steps are provided in a different sequence without departing from the scope of the claims herein. For example, the display apparatus may further comprise means for detecting a gaze direction, and wherein the method 700 may further comprise detecting a gaze direction, and using the detected gaze direction to determine a region of visual accuracy of an input image, processing the input image to generate the context image and the focus image, the context image having a first resolution and the focus image having a second resolution, the second resolution being higher than the first resolution, wherein the processing comprises masking a region of the context image that substantially corresponds to the region of visual accuracy of the input image and generating the focus image to substantially correspond to the region of visual accuracy of the input image, and controlling the at least one optical combiner to combine the projection of the rendered context image with the projection of the rendered focus image in a manner that the projection of the rendered focus image substantially overlaps the projection of the masked region of the rendered context image. In an example, the method 700 may comprise arranging for at least one first optical element of the optical combiner for any of allowing the projection of the rendered context image to pass through substantially, whilst reflecting the projection of the rendered focus image substantially, or allowing the projection of the rendered focus image to pass through substantially, whilst reflecting the projection of the rendered context image substantially. In another example, the method 700 may further comprise adjusting a location of the projection of the rendered focus image on the at least one first optical element. For example, in the method 700, the adjusting may be performed by controlling at least one first actuator of the at least one optical combiner to move the at least one focus display with respect to the at least one first optical element of the at least one optical combiner. In yet another example, in the method 700, the adjusting may be performed by controlling at least one second actuator of the at least one optical combiner to move at least one second optical element of the at least one optical combiner with respect to the at least one first optical element, wherein the at least one second optical element is positioned on an optical path between the at least one first optical element and the at least one focus display. For example, in the method 700, the adjusting may be performed by controlling at least one third actuator of the at least one optical combiner to move the at least one first optical element. Optionally the method 700, may further comprise controlling at least one fourth actuator of the display apparatus to move at least one focusing lens of the display apparatus with respect to the at least one focus display, so as to adjust a focus of the projection of the rendered focus image, wherein the at least one focusing lens is positioned on an optical path between the at least one first optical element and the at least one focus display.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A display apparatus comprising:
   at least one context display for rendering a context image, wherein an angular width of a projection of the rendered context image ranges from 40 degrees to 220 degrees;
   at least one focus display for rendering a focus image, wherein an angular width of a projection of the rendered focus image ranges from 5 degrees to 60 degrees;
   at least one optical combiner for combining the projection of the rendered context image with the projection of the rendered focus image to create a visual scene;
   means for detecting a gaze direction; and
   a processor coupled in communication with the at least one optical combiner and the means for detecting the gaze direction, wherein the processor is configured to:
   (a) receive an input image, and use the detected gaze direction to determine a region of visual accuracy of the input image;
   (b) process the input image to generate the context image and the focus image, the context image having a first resolution and the focus image having a second resolution, wherein:
      a region of the context image that substantially corresponds to the region of visual accuracy of the input image is masked,
      the focus image substantially corresponds to the region of visual accuracy of the input image, and
      the second resolution is higher than the first resolution; and
   (c) render the context image at the at least one context display and the focus image at the at least one focus display substantially simultaneously, whilst controlling the at least one optical combiner to combine the projection of the rendered context image with the projection of the rendered focus image in a manner that the projection of the rendered focus image substantially overlaps the projection of the masked region of the rendered context image.

2. The display apparatus of claim 1, wherein the at least one optical combiner comprises at least one first optical element that is arranged for any of:
   allowing the projection of the rendered context image to pass through substantially, whilst reflecting the projection of the rendered focus image substantially, or
   allowing the projection of the rendered focus image to pass through substantially, whilst reflecting the projection of the rendered context image substantially.

3. The display apparatus of claim 2, wherein the at least one first optical element of the at least one optical combiner is implemented by way of at least one of: a semi-transparent mirror, a semi-transparent film, a prism, a polarizer, an optical waveguide.

4. The display apparatus of claim 2, wherein the at least one optical combiner comprises at least one first actuator for moving the at least one focus display with respect to the at least one first optical element of the at least one optical combiner, wherein the processor is configured to control the at least one first actuator to adjust a location of the projection of the rendered focus image on the at least one first optical element.

5. The display apparatus of claim 2, wherein the at least one optical combiner comprises:
   at least one second optical element that is positioned on an optical path between the at least one first optical element and the at least one focus display, the at least one second optical element being selected from the group consisting of a lens, a prism, a mirror, and a beam splitter; and
   at least one second actuator for moving the at least one second optical element with respect to the at least one first optical element,
   wherein the processor is configured to control the at least one second actuator to adjust a location of the projection of the rendered focus image on the at least one first optical element.

6. The display apparatus of claim 2, wherein the at least one optical combiner comprises at least one third actuator for moving the at least one first optical element, wherein the processor is configured to control the at least one third actuator to adjust a location of the projection of the rendered focus image on the at least one first optical element.

7. The display apparatus of claim 2, wherein the display apparatus comprises:
   at least one focusing lens that is positioned on an optical path between the at least one first optical element and the at least one focus display; and
   at least one fourth actuator for moving the at least one focusing lens with respect to the at least one focus display,
   wherein the processor is configured to control the at least one fourth actuator to adjust a focus of the projection of the rendered focus image.

8. The display apparatus of claim 2, wherein the display apparatus comprises:
   at least one focusing lens that is positioned on an optical path between the at least one first optical element and the at least one focus display,
   wherein the processor is configured to control at least one active optical characteristic of the at least one focusing lens by applying a control signal to the at least one focusing lens.

9. The display apparatus of claim 1, wherein the at least one context display and/or the at least one focus display are selected from the group consisting of: a Liquid Crystal Display, a Light Emitting Diode-based display, an Organic Light Emitting Diode-based display, a micro Organic Light Emitting Diode-based display, and a Liquid Crystal on Silicon-based display.

10. The display apparatus of claim 1, wherein the at least one context display and/or the at least one focus display are implemented by way of at least one projector and at least one projection screen.

11. A method of displaying, via a display apparatus comprising at least one context display, at least one focus display and at least one optical combiner, the method comprising:
   (i) rendering a context image at the at least one context display, wherein an angular width of a projection of the rendered context image ranges from 40 degrees to 220 degrees;
   (ii) rendering a focus image at the at least one focus display, wherein an angular width of a projection of the rendered focus image ranges from 5 degrees to 60 degrees; and (iii) using the at least one optical combiner to combine the projection of the rendered context image with the projection of the rendered focus image to create a visual scene;
wherein the display apparatus further comprises means for detecting a gaze direction, and wherein the method further comprises:
(iv) detecting a gaze direction, and using the detected gaze direction to determine a region of visual accuracy of an input image;
(v) processing the input image to generate the context image and the focus image, the context image having a first resolution and the focus image having a second resolution, the second resolution being higher than the first resolution, wherein the processing comprises:
   masking a region of the context image that substantially corresponds to the region of visual accuracy of the input image; and
   generating the focus image to substantially correspond to the region of visual accuracy of the input image; and
(vi) controlling the at least one optical combiner to combine the projection of the rendered context image with the projection of the rendered focus image in a manner that the projection of the rendered focus image substantially overlaps the projection of the masked region of the rendered context image,
wherein (i), (ii) and (vi) are performed substantially simultaneously.

12. The method of claim 11, further comprising arranging for at least one first optical element of the at least one optical combiner for any of:
   allowing the projection of the rendered context image to pass through substantially, whilst reflecting the projection of the rendered focus image substantially, or
   allowing the projection of the rendered focus image to pass through substantially, whilst reflecting the projection of the rendered context image substantially.

13. The method of claim 12, further comprising adjusting a location of the projection of the rendered focus image on the at least one first optical element.

14. The method of claim 13, wherein the adjusting is performed by controlling at least one first actuator of the at least one optical combiner to move the at least one focus display with respect to the at least one first optical element of the at least one optical combiner.

15. The method of claim 13, wherein the adjusting is performed by controlling at least one second actuator of the at least one optical combiner to move at least one second optical element of the at least one optical combiner with respect to the at least one first optical element, wherein the at least one second optical element is positioned on an optical path between the at least one first optical element and the at least one focus display.

16. The method of claim 13, wherein the adjusting is performed by controlling at least one third actuator of the at least one optical combiner to move the at least one first optical element.

17. The method of claim 12, further comprising controlling at least one fourth actuator of the display apparatus to move at least one focusing lens of the display apparatus with respect to the at least one focus display, so as to adjust a focus of the projection of the rendered focus image, wherein the at least one focusing lens is positioned on an optical path between the at least one first optical element and the at least one focus display.

* * * * *